(12) United States Patent
van Oirschot et al.

(10) Patent No.: US 8,628,139 B2
(45) Date of Patent: Jan. 14, 2014

(54) SAFETY STRUCTURE FOR VEHICLES

(75) Inventors: Dirk van Oirschot, Luettelforst-Schwalmtal (DE); Georg Giazitzis, Kerpen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 13/181,521

(22) Filed: Jul. 13, 2011

(65) Prior Publication Data

US 2012/0175912 A1    Jul. 12, 2012

(30) Foreign Application Priority Data

Jul. 14, 2010    (DE) .......................... 10 2010 031 330

(51) Int. Cl.
*B62D 25/00* (2006.01)
(52) U.S. Cl.
USPC ............... 296/187.09; 296/187.1; 296/203.02

(58) Field of Classification Search
USPC .............. 296/187.09, 187.1, 187.03, 203.02; 280/784
See application file for complete search history.

(56) References Cited

U.S. PATENT DOCUMENTS

| | | | | |
|---|---|---|---|---|
| 6,692,052 B1 * | 2/2004 | Sutton et al. | ................. | 296/35.2 |
| 7,900,995 B2 * | 3/2011 | Sato et al. | ................. | 296/187.1 |
| 7,926,847 B2 * | 4/2011 | Auer et al. | .................... | 280/784 |

* cited by examiner

*Primary Examiner* — Joseph Pape
(74) *Attorney, Agent, or Firm* — Joseph E. Root

(57) ABSTRACT

In order to optimize the transmitting of force and in order to keep the longitudinal member undamaged in the event of a low impact speed, for example in the event of an accident involving a pedestrian, and in order to permit easy exchangeability of the longitudinal member, it is proposed that, in a normal position, the lower longitudinal member is held spaced apart in the direction of travel from an associated transverse link and can be brought by the frontal impact into a crash position in which the longitudinal member acts on the transverse link in a manner transmitting force.

8 Claims, 5 Drawing Sheets

SAFETY STRUCTURE FOR VEHICLES

TECHNICAL FIELD

The present disclosure relates generally to a safety structure for vehicles, and more particularly to a safety structure designed to distribute forces upon impact.

BACKGROUND

As is known, modern safety structures have an upper and a lower load path for transmitting and absorbing forces upon frontal impact generally, a lower longitudinal member is provided in the lower load path for transmitting forces applied in the lower region of a front bumper. A longitudinal member of this type is generally provided symmetrically on both sides of the front end safety structure, such as a member taking the form of a lower longitudinal member on the left side and a lower longitudinal member on the right side.

European Patent EP 1604869B1 discloses a safety structure in which that end of the lower longitudinal member lying in front in the direction of travel is held by part of the engine suspension. Another document, DE 19851495A1 proposes connecting the lower longitudinal member to an associated upper longitudinal member or to the associated sill at a point remote from the bumper.

SUMMARY

The present disclosure presents a safety structure having a lower longitudinal member structure to optimally transmit impact forces. As disclosed, this element remains undamaged in the event of a low speed impact, for example in the event of an accident involving a pedestrian, to the extent that the lower longitudinal member can be reused. A further aim 1s for the longitudinal member to be easily exchangeable.

That result is achieved according to the present. Advantageous developments are described in the appended dependent claims. In particular, in a normal position, the lower longitudinal member is held spaced apart in the direction of travel from an associated transverse link and can be brought by the frontal impact into a crash position in which the longitudinal member acts on the transverse link to transmit impact force.

As employed herein, an "associated transverse link" denotes the transverse link on the left side in the case of the lower longitudinal member on the left side and correspondingly the transverse link on the right side in the case of the lower longitudinal member on the right side. As a consequence of being spaced apart from the transverse link under a normal load, essentially only the lower longitudinal member has to be held. Forces acting on the front end of the vehicle as a consequence of a frontal impact are transmitted to the transverse link by the lower longitudinal member only when that element moves into the crash position and especially in the crash position. The transverse link transmits the forces, if those forces are not absorbed by the work of deformation, onto the supporting structure.

In the crash position, the longitudinal member can be supported directly on the transverse link. For this purpose, that end of the lower longitudinal member located in front in the direction of travel may have an end side, matched to the outer side of the transverse link assigned to the lower longitudinal member, for bearing against the transverse link However, direct support via a device which is connected between and which preferably permits optimized inputting of force is preferred. That condition may refer to the magnitude of the pressure caused by inputting force to the transverse link or to the direction and directional constancy of inputting force to the transverse link during the frontal impact. The device may also be designed in such manner that it absorbs a desired amount of input energy. Depending on the respective type of vehicle or on the further construction of the safety structure, the lower load path arranged according to the present disclosure of the longitudinal member may be designed in such a manner that it can absorb certain forces in the event of an overload at high impact speeds. For example, impact forces on the order of magnitude of approximately 35 kN can be passed on to the supporting structure and can absorb energy, for example within the range of a deformation of approximately 700 mm.

Provision may be made for the lower longitudinal member to be brought into the crash position only at high impact speeds. However, provision is preferably made for the lower longitudinal member to be brought into the crash position even at low impact speeds. In that case, the lower longitudinal member is preferably designed to transmit forces occurring at low impact speeds without suffering damage. Since, under a normal load, the member does not continue to be loaded by transmission of force, the provided holder can have a correspondingly low strength. As explained further below, the holder can be produced in a uncomplicated manner and can be designed to be readily exchanged. In addition, the holder can be designed to absorb impact energy by means of deformation on the path from the normal position into the crash position.

Upon frontal impact, the lower longitudinal member is guided out of the normal position into the crash position. The guidance can be configured so that, even at relatively high impact speeds, the lower longitudinal member is positioned in the crash position on the transverse link in a mechanically favorable manner in terms of force. In the crash position, the lower longitudinal member can preferably be arranged level or in alignment with the transverse link The lower longitudinal member can therefore be guided toward the transverse link in such a manner that the longitudinal member, in the crash position, can input a force which is to be transmitted in a line or in alignment and therefore in a manner at least virtually free from bending moments into the transverse link. Furthermore, in the crash position, the longitudinal member can be arranged in a favorable manner mechanically in terms of force, in particular with regard to the bending strength, with the longitudinal direction at least approximately parallel to the direction of travel and therefore in the direction of the frontal impact.

That end of the lower longitudinal member located in front in the direction of travel can be held on the vehicle's front axle support by a holder, preferably designed as a transverse holder. The longitudinal member can therefore be held in a mechanically stable manner in two regions spaced apart from each other, in which the longitudinal member can be fixed at the end at the rear in the direction of travel to a crossmember, as customary. The holder can therefore act laterally on the lower longitudinal member, in a manner not interfering structurally. The transverse holder preferably acts with respect to the longitudinal extent at least approximately in the transverse direction (the y direction) on the lower longitudinal member. Because the transverse holder bears against the axle support, the longitudinal member can be kept steady in the normal position unaffected by possible movements of the transverse link during travel. This makes it possible in turn for the holder to be able to be designed in a correspondingly uncomplicated manner.

Upon a frontal impact, the lower longitudinal member can be guided at the end located in front in the direction of travel toward the transverse link into the crash position. As shown further below, the holder or the transverse holder can serve as a holder and guide for the longitudinal member during movement out of the normal position into the crash position. Furthermore, the holder or the transverse holder can provide support for the lower longitudinal member front end, preferably associated with optimized inputting of force.

In a structurally simple manner, a first end region of the transverse holder can feature a receptacle for that end of the lower longitudinal member which is in front in the direction of travel. In this case, the receptacle, in the normal position, can be spaced apart from the transverse link and, in the crash position, can bear against the transverse link in an effective manner in terms of force.

In a second end region spaced apart from the first end region, the transverse holder can include connecting means for connecting to the front axle support. A section can be arranged between the first and second end regions, in which the first end region can be moved relative to the second end region, such as being bent over, folded or bent down, preferably via deformation, with respect to a first axis perpendicular to the longitudinal axes of the transverse holder and lower longitudinal member. In that configuration, deformation occurs in a specific manner in the section. The section can exhibit a lower deformation resistance in respect of forces counter to the direction of travel than the remaining sections of the transverse holder. For this purpose, the section can have a specific structural and/or material-specific weakening of the strength, as by means of a reduced cross section, an incision, or a softening heat treatment. In contrast, the section is preferably provided without reinforcing structures. The section can advantageously be designed similar to a tab with a cross section having a larger side, in which the larger side is preferably arranged at least approximately perpendicular to the direction of travel. By the time the lower longitudinal member moves into the crash position, a certain amount of force will already have been absorbed by deformation of the transverse holder.

The receptacle can preferably comprise a bearing surface which bears against the transverse link. The lower longitudinal member can therefore indirectly translate the force to be transmitted into the transverse link by way of the receptacle. In the normal position, the bearing surface can be arranged at an angle to the longitudinal axis of the lower longitudinal member and it can be pivoted against the transverse link upon movement of the lower longitudinal member into the crash position. In the crash position, the bearing surface is preferably arranged perpendicular to the direction of travel. The lower longitudinal member is preferably connected with the front end spaced apart from the bearing surface to the transverse holder or is mounted thereon.

The receptacle or the bearing surface can be matched to that section of the outer side of the transverse link in which the bearing surface bears in the crash position. For easier bearing against the transverse link, the bearing surface can preferably be formed to have a curvature symmetrical with respect to an xy plane, as well as a radius of curvature oriented counter to the direction of travel. The bearing surface can therefore have a channel-like shape, with the bearing surface being able to have a flat channel base for bearing in a planar manner against the outer side of the transverse link. Sliding away centrally into the channel at the curvature, the lower longitudinal member can be guided in the crash position, in the event of the frontal accident, into a stable bearing position in which it can act on the transverse link in a manner free from bending moments.

For the relative pivoting of the longitudinal member and transverse holder out of the normal position into the crash position, the front end of the lower longitudinal member can be arranged in the receptacle region so that it can be pivoted about a second axis preferably parallel and perpendicular to the longitudinal axis of the lower longitudinal member. Loading the lower longitudinal member as a consequence of the first end region of the transverse receptacle being bent down, folded, etc. can therefore be minimized, making it possible for the lower longitudinal member to remain undamaged, particularly during a low-speed.

The receptacle of the transverse holder can include a receptacle space into which the front end of the lower longitudinal member projects and in which the lower longitudinal member is preferably mounted pivotably. The front end can therefore be protected and can be arranged and mounted pivotably in the receptacle or in the receptacle space at a certain distance from the bearing surface.

The transverse holder is preferably plugged onto the axle support. A clamp having limbs can be provided as the connecting means for connecting the transverse holder to the front axle support, the clamp engaging over the front axle support on the lower and upper sides in order to form the connection, and bearing against the latter in a manner remaining loose preferably under pre-stress. The clamp can also latch onto the front axle support.

At least in the crash position, the lower longitudinal member can act between a rear bearing of the transverse link in the direction of travel and a front bearing in the direction of travel on the front axle support, preferably in a manner transmitting force to the transverse link approximately in alignment with the front bearing. Particularly in the latter case, the force applied to the transverse link by the lower longitudinal member can be applied further to the axle support in a line and therefore at least virtually in a manner free from bending moments.

It is particularly preferred that the transverse holder be able to be produced in a folded manner from a plate as a single piece. The receptacle space and/or the fastening means can be formed by means of the folds. The transverse holder can therefore be manufactured in a simple manner in terms of manufacturing and cost-effectively. In the event of a frontal impact at low impact speed, in which, according to the present disclosure, the lower longitudinal member remains undeformed but the transverse holder has been deformed in order to transmit force to the transverse link, the transverse holder can be pulled from the lower longitudinal when replacement is required.

In a further deformation step upon a frontal impact, the front end of the longitudinal member can be detached from the transverse holder and can bear directly against the inner side of the receptacle space without substantially damaging the longitudinal member. In that manner, the longitudinal member can therefore be optimally aligned with the transverse link. At an even greater loading, however, a risk exists that the longitudinal member will be damaged if the longitudinal members bear directly against the transverse link.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

Figure 1:
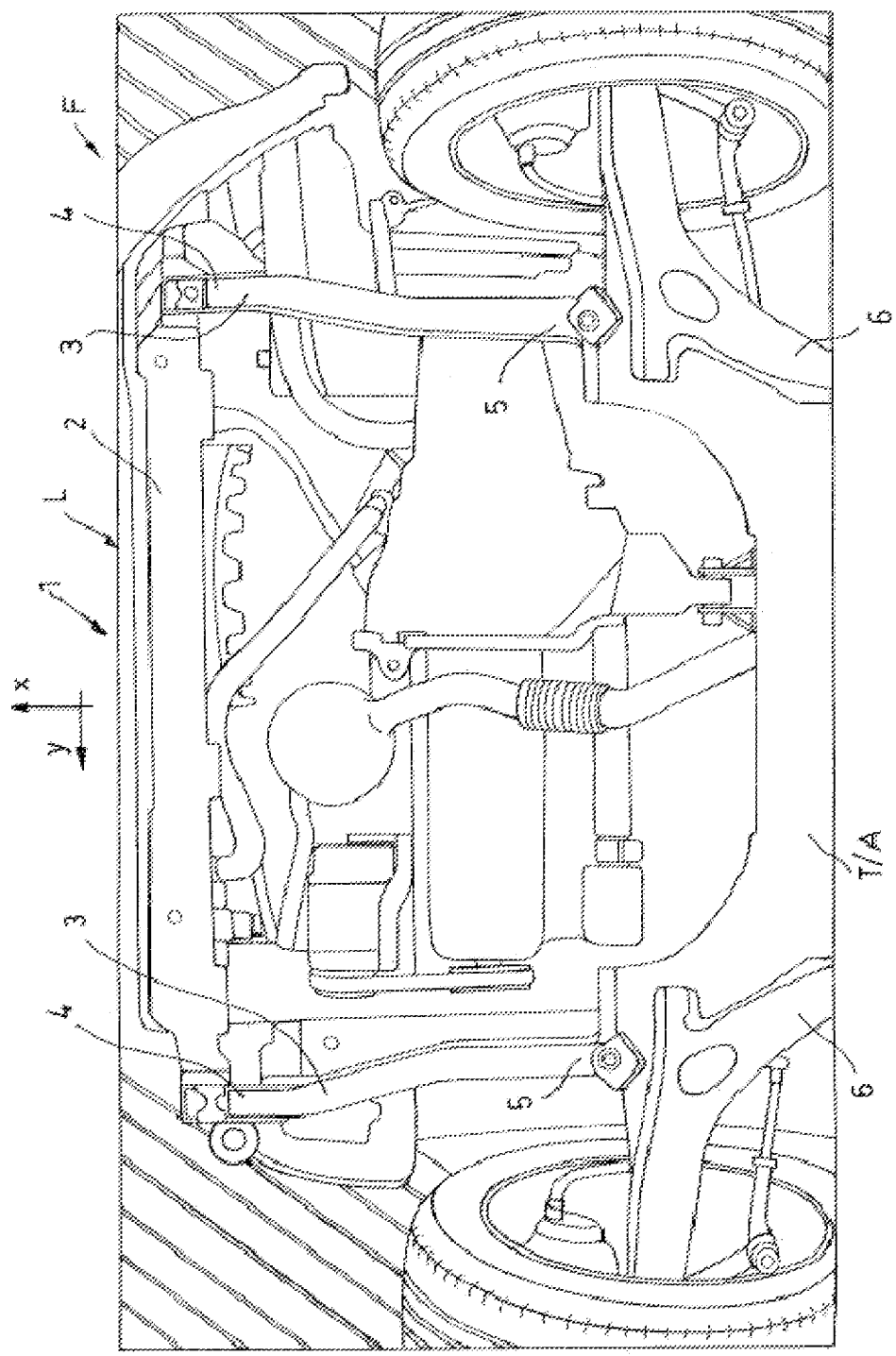
FIG. 1 illustrates a vehicle having a safety structure with two lower longitudinal members, as seen from below the vehicle.
Figure 2:
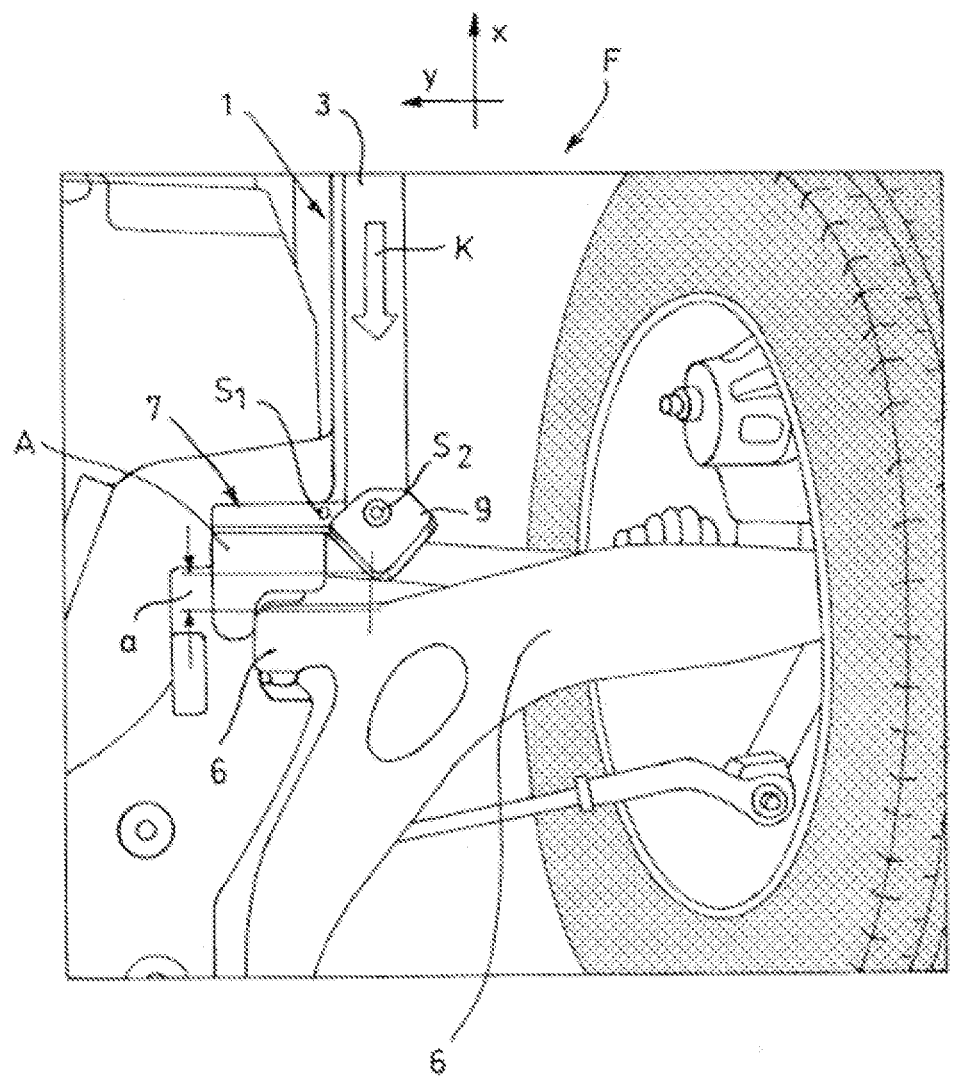
FIG. 2 is an enlarged detail view of portion II from FIG.

The following detailed description is made with reference to the figures. Exemplary embodiments are described to illustrate the subject matter of the disclosure, not to limit its scope, which is defined by the appended claims.
Exemplary Embodiments FIGS. 1-4 each show a safety structure 1 for vehicles F in different views, details, and representations. In addition to an upper load path (not visible here), the safety structure 1 has a lower load path L with a lower crossmember 2 and two lower longitudinal members 3 for transmitting force into the supporting structure T upon a frontal impact of vehicle F.

The two lower longitudinal members 3 are arranged symmetrically with respect to the center of the vehicle, and the longitudinal members 3 are connected to the crossmember 2 at an end 4 located at the rear in the direction of travel x. Longitudinal members 3 are each arranged at the end 5, at the front in the direction of travel x at a distance (FIG. 2) from an associated transverse link 6. The members 3 are held laterally in this position by a transverse holder 7, which in turn is connected to the front axle support. The longitudinal members 3 are shown in FIGS. 1-4A in a normal position, with vehicle F located in a normal road position and longitudinal members 3 basically unloaded.

Figure 4A:
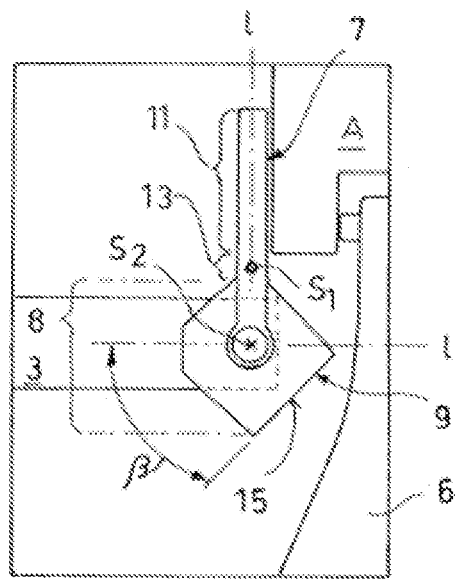
FIGS. 4A-4C depict the basic movement of the longitudinal member out of the normal position (FIG. 4A) into a crash position (FIG. 4C).
Figure 4B:
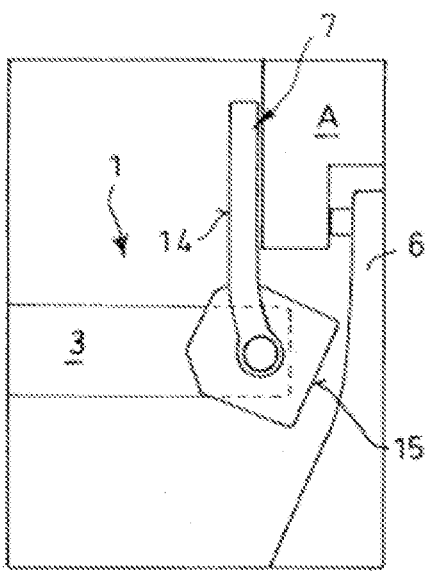
Figure 4C:
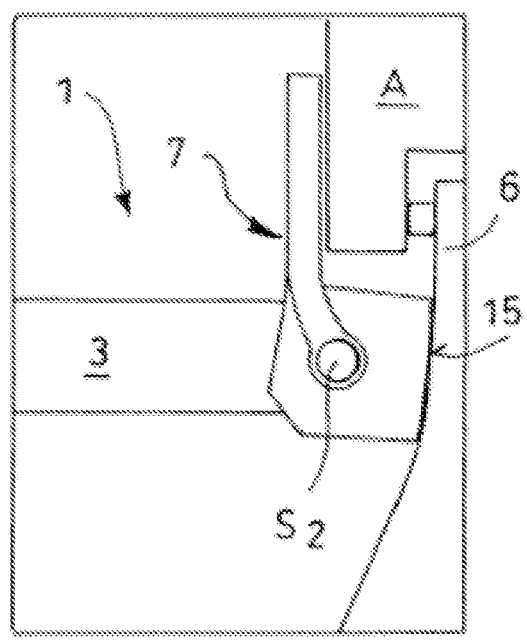

As is shown in FIGS. 4A-4C in a sequence of three drawing, upon the frontal impact the longitudinal members 3 can each be brought into a crash position, shown in FIG. 4C, in which they act on the respectively associated transverse link 6 in a manner transmitting force K. The transverse holder 7 also acts here as a guide positioning the longitudinal member 3 into the crash position, in which the longitudinal member acts on the transverse link 6 in an effective manner in terms of force and so as to be aligned in the direction of travel x. The longitudinal member 3 is supported here on the transverse link 6 via the transverse holder 7.

In a first end region 8 facing the longitudinal member 3, the transverse holder 7 includes a receptacle 9 for the longitudinal member 3. In normal position, receptacle 9 is arranged at a distance from transverse link 6. In the crash position, receptacle 9 bears against the transverse link 6. The receptacle 9 has a receptacle space 10, open toward longitudinal member 3, in which the front end 5 of the longitudinal member 3 engages.

Figure 3:
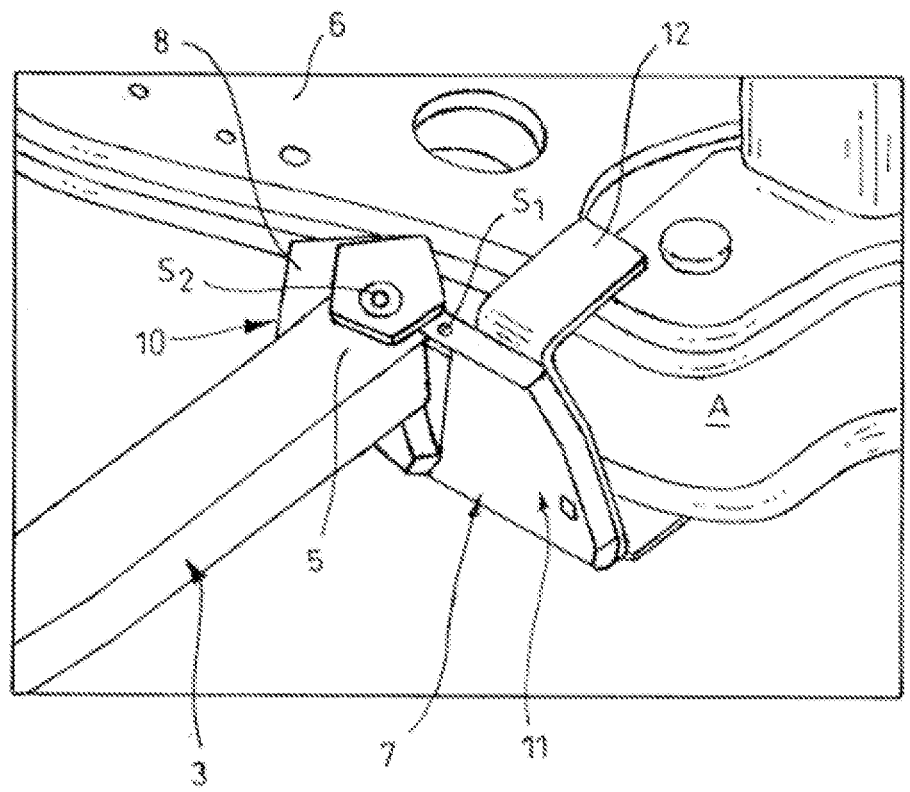
FIG. 3 is a schematic top view of the longitudinal member of the present disclosure, connected to a transverse link.

As can be seen in particular in FIG. 3, the transverse holder 7 is plugged at a second end region 11 via fastening means, such as clamp 12, over the front axle support A of the support structure T, counter to direction of travel x. Clamp 12 bears against the axle support A under pre-stress. The transverse holder 7 is therefore held displaceably to a certain limited extent in the transverse direction y and in the direction of travel x such that the longitudinal member 3 is not connected rigidly via the transverse holder 7. Therefore that member remains largely unloaded in the normal road position of the vehicle.

As shown schematically in FIG. 4, the first end region 8 of transverse holder 7 is bent over or down relative to the second end region 11. The bending occurs around a first axis S1, perpendicular to the direction of travel x, to the transverse direction y; and to the longitudinal axes I. (The positional indication of the first axis S1 in FIG. 4A should merely be regarded as approximate because of the deformation which occurs here. It may also lie outside the transverse holder). The bending, and a correspondingly exact guidance of the longitudinal member 3, can both occur in a controlled manner, because a section 13 deforms in a controlled manner. That section is constructed having a relatively lower deformation resistance to forces directed opposite to the direction of travel x. Section 13 lies between the two end regions 8, 11. The transverse holder 7 is folded here cost-effectively from a plate, with strength-increasing folds provided in the two end regions to form clamp 12. The folds also delimit the receptacle space 10. The portion of transverse holder 7 lying in section 13 is shaped as a tab, with a larger side surface 14 perpendicular to the direction of travel x.

Receptacle 9 includes a bearing surface 15, defining receptacle space 10. In the normal position, bearing surface 15 describes an angle β to the longitudinal axis I of lower longitudinal member 3. In the illustrated embodiment, angle β is approximately 45°. During the bending of transverse receptacle 7 in the crash position of FIG. 4C, described above, bearing surface 15 rotates against the transverse link 6 in a planar manner, with the distance a and the angle β being correspondingly matched. As shown, the profile of bearing surface 15 matches the target area on transverse link 6 where the bearing surface makes contact. At the front end 5, longitudinal member 3 is arranged in receptacle 9 such that it can pivot about a second axis S2. The axis S2 lies parallel to the first axis S1. This pivoting motion facilitates correct guidance of the bearing surface 15 against the transverse link 6. The front end 5 and the bearing are protected in the receptacle space 10.

FIG. 4C indicates the position of longitudinal member 3 in the crash position during a low-speed impact. As shown, of longitudinal member 3 bears against the transverse link 6 via the transverse holder 7. That action deforms transverse holder 7, which cannot afterward be reused. Transverse holder 7 can substantially absorb the kinetic energy applied to longitudinal member 3, however, and it can transmit that energy to transverse link 6, thus leaving longitudinal member 3 undeformed. As a result, longitudinal member 3 can be reused upon repair. Since the transverse holder 7 is merely plugged onto the axle support A, it can easily be removed from the latter, which further simplifies the installation.

Those of skill in the art will understand that greater impact speed or greater kinetic energy would produce greater deformation of transverse holder 7. That result could occur, for example, if longitudinal member 3 were detached from the pivoting connection to the receptacle 8, so that it impacted bearing surface 15. Possible results of higher-energy impact is not illustrated or discussed here.

The specification sets out a number of specific exemplary embodiments, but those skilled in the art will understand that variations in these embodiments will naturally occur in the course of implementing the subject matter of the disclosure in specific environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

We claim:

1. A safety structure for vehicles, configured to transmit an impact load from a vehicle front end through a longitudinal member to a transverse link connected to the vehicle body, the safety structure comprising:

a transverse holder, extending transversely to the vehicle direction of travel, having a first end fixed to a portion of the vehicle body and a second end pivotally fixed to the longitudinal member, the second end including a tab structure having a bearing surface lying at a selected angle to the vehicle direction of travel, the bearing surface being shaped to conform to a target portion of the transverse link, and the transverse holder being positioned to maintain the bearing surface a predetermined distance from the transverse link;

wherein the transverse holder includes a controlled deformation zone, located between the first end and the second end of the holder, for deforming around an axis perpendicular to the vehicle direction of travel upon application of sufficient force to deform the deformation zone; and the transverse holder is positioned, and the selected angle of the bearing surface is chosen, to bring the bearing surface into contact with the target portion of the transverse link during deformation of the deformation zone.

2. The safety structure of claim 1, wherein the transverse holder first end is fixed to a vehicle axle support.

3. The safety structure of claim 1, wherein the transverse holder is connected to a vehicle front axle support.

4. The safety structure of claim 1, wherein the target portion of the transverse link lies on the longitudinal axis of the longitudinal member but apart from the longitudinal member itself.

5. The safety structure of claim 1, wherein the pivot axis around which the transverse holder second end is pivotally fixed to the longitudinal member is parallel to the axis of deformation of the transverse holder.

6. The safety structure of claim 1, wherein the bearing surface selected angle is about 45 degrees.

7. A transverse holder for a safety structure for vehicles, the safety structure configured to transmit an impact load from a vehicle front end through a longitudinal member to a transverse link connected to the vehicle body, the transverse holder comprising:

a transverse holder, extending transversely to the vehicle direction of travel, having a first end fixed to a portion of the vehicle body and a second end pivotally fixed to the longitudinal member, the second end including a tab structure having a bearing surface lying at a selected angle to the vehicle direction of travel, the bearing surface being shaped to conform to a target portion of the transverse link, and the transverse holder being positioned to maintain the bearing surface a predetermined distance from the transverse link;

wherein the transverse holder includes a controlled deformation zone, located between the first end and the second end of the holder, for deforming around an axis perpendicular to the vehicle direction of travel upon application of sufficient force to deform the deformation zone; and the transverse holder is positioned, and the selected angle of the bearing surface is chosen, to bring the bearing surface into contact with the target portion of the transverse link during deformation of the deformation zone.

8. A safety structure for vehicles, configured to transmit an impact load from a vehicle front end through a longitudinal member to a transverse link connected to the vehicle body, the safety structure comprising:

a left safety structure and a right safety structure, each structure including a transverse holder, extending transversely to the vehicle direction of travel, having a first end fixed to a portion of the vehicle body and a second end pivotally fixed to the longitudinal member, the second end including a tab structure having a bearing surface lying at a selected angle to the vehicle direction of travel, the bearing surface being shaped to conform to a target portion of the transverse link, and the transverse holder being positioned to maintain the bearing surface a predetermined distance from the transverse link;

wherein each transverse holder includes a controlled deformation zone, located between the first end and the second end of the holder, for deforming around an axis perpendicular to the vehicle direction of travel upon application of sufficient force to deform the deformation zone; and each transverse holder is positioned, and the selected angle of the bearing surface is chosen, to bring the bearing surface into contact with the target portion of the transverse link during deformation of the deformation zone.

* * * * *